US009576446B2

(12) United States Patent
Zellers

(10) Patent No.: US 9,576,446 B2
(45) Date of Patent: Feb. 21, 2017

(54) ULTRA-THIN HAPTIC SWITCH WITH LIGHTING

(71) Applicant: Novasentis, Inc., Burlingame, CA (US)

(72) Inventor: Brian C. Zellers, Bellefonte, PA (US)

(73) Assignee: Novasentis, Inc., State College, PA (US)

( * ) Notice: Subject to any disclaimer, the term of this patent is extended or adjusted under 35 U.S.C. 154(b) by 30 days.

(21) Appl. No.: 14/454,526

(22) Filed: Aug. 7, 2014

(65) Prior Publication Data

US 2016/0042888 A1 Feb. 11, 2016

(51) Int. Cl.

*G08B 6/00* (2006.01)
*G06F 3/01* (2006.01)
*H01H 13/85* (2006.01)
*H01H 13/83* (2006.01)

(52) U.S. Cl.

CPC ................. *G08B 6/00* (2013.01); *G06F 3/016* (2013.01); *H01H 13/85* (2013.01); *H01H 13/83* (2013.01); *H01H 2209/016* (2013.01); *H01H 2215/05* (2013.01); *H01H 2219/014* (2013.01)

(58) Field of Classification Search

None
See application file for complete search history.

(56) References Cited

U.S. PATENT DOCUMENTS 5,263,876 A 11/1993 Johnescu et al.
5,350,966 A 9/1994 Culp
5,519,278 A 5/1996 Kahn et al.
6,376,971 B1 4/2002 Pelrine et al.
6,423,412 B1 7/2002 Zhang et al.
6,605,246 B2 8/2003 Zhang et al.
6,703,257 B2 3/2004 Takeuchi et al.
(Continued)

FOREIGN PATENT DOCUMENTS

JP 2010283926 A 12/2010
JP 2011172339 9/2011
(Continued)

OTHER PUBLICATIONS

Matysek, Marc et al., "Combined Driving and Sensing Circuitry for Dielectric Elastomer Actuators in mobile applications", Electroactive Polymer Actuators and Devices (EAPAD) 2011, Proc. of SPIE vol. 7976, 797612, 11 pages.
(Continued)

*Primary Examiner* — Mohamed Barakat
(74) *Attorney, Agent, or Firm* — Hogan Lovells US LLP

(57) ABSTRACT

A haptic switch includes: (a) a force sensor responding a mechanical stimulus by providing a sensing signal; (b) a processing circuit receiving the sensing signal and providing a control signal; and (c) an electromechanical polymer (EMP) actuator receiving the response control signal and providing a haptic response. The force sensor and the EMP actuator may each be provided on a flexible circuit covered by a protective layer overlying the flexible circuit. The haptic switch may include a graphic layer on which is provided a symbol representing a key. In that haptic switch, the symbol, the light source, the EMP actuator and the force sensor are aligned such that the light source illuminates the symbol and such that, when a user pushes on the symbol, the user's push applies a pressure on the force sensor and the EMP actuator's haptic response is provided in the vicinity of the force sensor.

22 Claims, 4 Drawing Sheets

(56) References Cited

U.S. PATENT DOCUMENTS

| | | | |
|---|---|---|---|
| 6,787,238 B2 | 9/2004 | Zhang et al. | |
| 6,809,462 B2 | 10/2004 | Pelrine et al. | |
| 6,877,325 B1 | 4/2005 | Lawless | |
| 6,888,291 B2 | 5/2005 | Arbogast et al. | |
| 7,038,357 B2 | 5/2006 | Goldenberg et al. | |
| 7,339,572 B2 | 3/2008 | Schena | |
| 7,368,862 B2 | 5/2008 | Pelrine et al. | |
| 7,567,681 B2 | 7/2009 | Pelrine et al. | |
| 7,944,735 B2 | 5/2011 | Bertin et al. | |
| 7,952,261 B2 | 5/2011 | Lipton et al. | |
| 7,971,850 B2 | 7/2011 | Heim et al. | |
| 8,222,799 B2 | 7/2012 | Polyakov et al. | |
| 8,362,882 B2 | 1/2013 | Heubel et al. | |
| 8,384,271 B2 | 2/2013 | Kwon et al. | |
| 8,390,594 B2 | 3/2013 | Modarres et al. | |
| 8,564,181 B2 | 10/2013 | Choi et al. | |
| 9,053,617 B2 | 6/2015 | Ramstein et al. | |
| 9,164,586 B2 | 10/2015 | Zellers et al. | |
| 9,170,650 B2 | 10/2015 | Ramstein et al. | |
| 9,183,710 B2 | 11/2015 | Zellers et al. | |
| 2007/0200467 A1 | 8/2007 | Heydt et al. | |
| 2008/0284277 A1 | 11/2008 | Kwon et al. | |
| 2009/0002205 A1* | 1/2009 | Klinghult | G06F 3/016 341/33 |
| 2009/0002328 A1 | 1/2009 | Ullrich et al. | |
| 2009/0322496 A1* | 12/2009 | da Costa | G06F 3/016 340/407.2 |
| 2010/0079264 A1 | 4/2010 | Hoellwarth | |
| 2010/0090813 A1 | 4/2010 | Je et al. | |
| 2010/0316242 A1 | 12/2010 | Cohen et al. | |
| 2011/0038625 A1 | 2/2011 | Zellers et al. | |
| 2011/0133598 A1 | 6/2011 | Jenninger et al. | |
| 2011/0193802 A1* | 8/2011 | Park | G02F 1/133615 345/173 |
| 2011/0261021 A1* | 10/2011 | Modarres | G06F 3/016 345/177 |
| 2011/0290686 A1 | 12/2011 | Huang | |
| 2012/0017703 A1 | 1/2012 | Ikebe et al. | |
| 2012/0068957 A1* | 3/2012 | Puskarich | G06F 3/016 345/174 |
| 2012/0105333 A1 | 5/2012 | Maschmeyer et al. | |
| 2012/0121944 A1 | 5/2012 | Yamamoto et al. | |
| 2012/0126663 A1 | 5/2012 | Jenninger et al. | |
| 2012/0126959 A1 | 5/2012 | Zarrabi et al. | |
| 2012/0128960 A1 | 5/2012 | Busgen et al. | |
| 2012/0178880 A1 | 7/2012 | Zhang et al. | |
| 2012/0194448 A1 | 8/2012 | Rothkopf | |
| 2012/0206248 A1 | 8/2012 | Biggs | |
| 2012/0223880 A1 | 9/2012 | Birnbaum et al. | |
| 2013/0207793 A1 | 8/2013 | Weaber et al. | |
| 2014/0085065 A1 | 3/2014 | Biggs et al. | |
| 2014/0090424 A1 | 4/2014 | Charbonneau et al. | |
| 2014/0140551 A1 | 5/2014 | Ramstein | |
| 2014/0191973 A1 | 7/2014 | Zellers et al. | |
| 2015/0185842 A1* | 7/2015 | Picciotto | G06F 3/0414 345/173 |

FOREIGN PATENT DOCUMENTS

| | | |
|---|---|---|
| JP | 2012134998 A | 7/2012 |
| KR | 20060107259 A | 10/2006 |
| KR | 20110110212 A | 10/2011 |
| KR | 20120013273 | 2/2012 |
| KR | 20120063318 | 6/2012 |
| KR | 20120078529 | 7/2012 |
| KR | 20120105785 A | 9/2012 |
| WO | 2010/085575 A1 | 7/2010 |

OTHER PUBLICATIONS

Neese, Bret et al., "Large Electrocaloric Effect in Ferroelectric Polymers Near Room Temperature", Science vol. 321, Aug. 8, 2008, pp. 821-823.

Zhang Q. M. et al., "Giant Electrostriction and Relaxor Ferroelectric Behavior in Electron-Irradiated Poly(vinylidene fluoride-trifluoroethylene) Copolymer", Science vol. 280, Jun. 26, 1998, pp. 2101-2104.

Xia F. et al., "High Electromechanical Responses in a Poly(vinylidene fluoride-trifluoroethylene-chlorofluoroethylene) Terpolymer", Advanced Materials, vol. 14, Issue 21, Nov. 2002, pp. 1574-1577.

PCT International Search Report and Written Opinion date of mailing Dec. 23, 2013, International Patent Application No. PCT/US2013/053594, 9 pages.

PCT International Search Report and Written Opinion date of mailing Mar. 17, 2014, International Patent Application No. PCT/US2013/071085, 10 pages.

PCT International Search Report and Written Opinion date of mailing Mar. 13, 2014, International Patent Application No. PCT/US2013/071072, 15 pages.

PCT International Search Report and Written Opinion date of mailing Mar. 20, 2014, International Patent Application No. PCT/US2013/071075, 12 pages.

PCT International Search Report and Written Opinion date of mailing Mar. 28, 2014, International Patent Application No. PCT/US2013/071078, 13 pages.

PCT International Search Report and Written Opinion date of mailing Apr. 28, 2014, International Patent Application No. PCT/U52013/071062, 11 pages.

PCT International Preliminary Report on Patentability date of mailing Jun. 4, 2015, International Patent Application No. PCT/US2013/071072, 9 pages.

PCT International Preliminary Report on Patentability date of mailing Jun. 4, 2015, International Patent Application No. PCT/US2013/071075, 9 pages.

PCT International Preliminary Report on Patentability date of mailing Jun. 4, 2015, International Patent Application No. PCT/US2013/071078, 10 pages.

PCT International Preliminary Report on Patentability date of mailing Jun. 4, 2015, International Patent Application No. PCT/US2013/071085, 7 pages.

PCT International Preliminary Report on Patentability date of mailing Jul. 16, 2015, International Patent Application No. PCT/IB2013/003212, 15 pages.

PCT International Written Opinion date of mailing Oct. 15, 2014, International Patent Application No. PCT/IB2013/003212, 20 pages.

* cited by examiner

ULTRA-THIN HAPTIC SWITCH WITH LIGHTING

BACKGROUND OF THE INVENTION

1. Field of the Invention

The present invention relates to an ultra-thin mechanical transducer. In particular, the present invention relates to an ultra-thin mechanical transducer implemented using electromechanical polymer (EMP) technology.

2. Discussion or the Related Art

EMP transducers are particularly applicable to tactile haptic user interfaces in many consumer electronic devices (e.g., cellular telephones and tablet computers). Such applications are described, for example, in copending U.S. patent applications ("Copending Applications") (i) Ser. No. 13/683,980, entitled "Haptic System with Localized Response," filed Nov. 21, 2012, and (ii) Ser. No. 13/683,928, entitled "EMP Actuators for Deformable Surface and Keyboard Application," also filed on Nov. 21, 2012. The disclosures of the Copending Applications are hereby incorporated by reference in their entireties.

One further advance in the EMP transducer disclosed in these Copending Applications is that although they have a thin profile, they are capable of providing a relatively large surface deformation, which allows their use in an embossed keyboard application. Such an application is described, for example, in U.S. patent application ("Embossed Key Application"), Ser. No. 13/735,804, entitled "Thin Profile User Interface Device and Method Providing Localized Haptic Response," filed on Jan. 7, 2013. The disclosure of the Embossed Key Application is hereby incorporated by reference in its entirety.

SUMMARY

According to one embodiment of the present invention, a haptic switch includes: (a) a force sensor responding to a mechanical stimulus by providing a sensing signal; (b) a processing circuit receiving the sensing signal and providing a control signal; and (c) an electromechanical polymer (EMP) actuator receiving the response control signal and providing a haptic response. For example, the force sensor may be implemented by a pressure-sensitive EMP sensor (e.g., a force sensing resistor), the processing circuit may be implemented by an amplification circuit, and the haptic response may be a vibration response. In one embodiment, a light source (e.g., a printed LED circuit) provides illumination in vicinity of the force sensor. The force sensor and the EMP actuator may each be provided on a flexible circuit covered by a protective layer overlying the flexible circuit.

According to one embodiment of the present invention, the haptic switch includes a graphic layer on which is provided a symbol representing a key. In that haptic switch, the symbol, the light source, the EMP actuator and the force sensor are aligned such that the light source illuminates the symbol and such that, when a user pushes on the symbol, the user's push applies a pressure on the force sensor and the EMP actuator's haptic response is provided in the vicinity of the force sensor.

The present invention is better understood upon consideration of the detailed description below, in conjunction with the accompanying drawings.

DETAILED DESCRIPTION OF THE PREFERRED EMBODIMENTS

Figure 1:
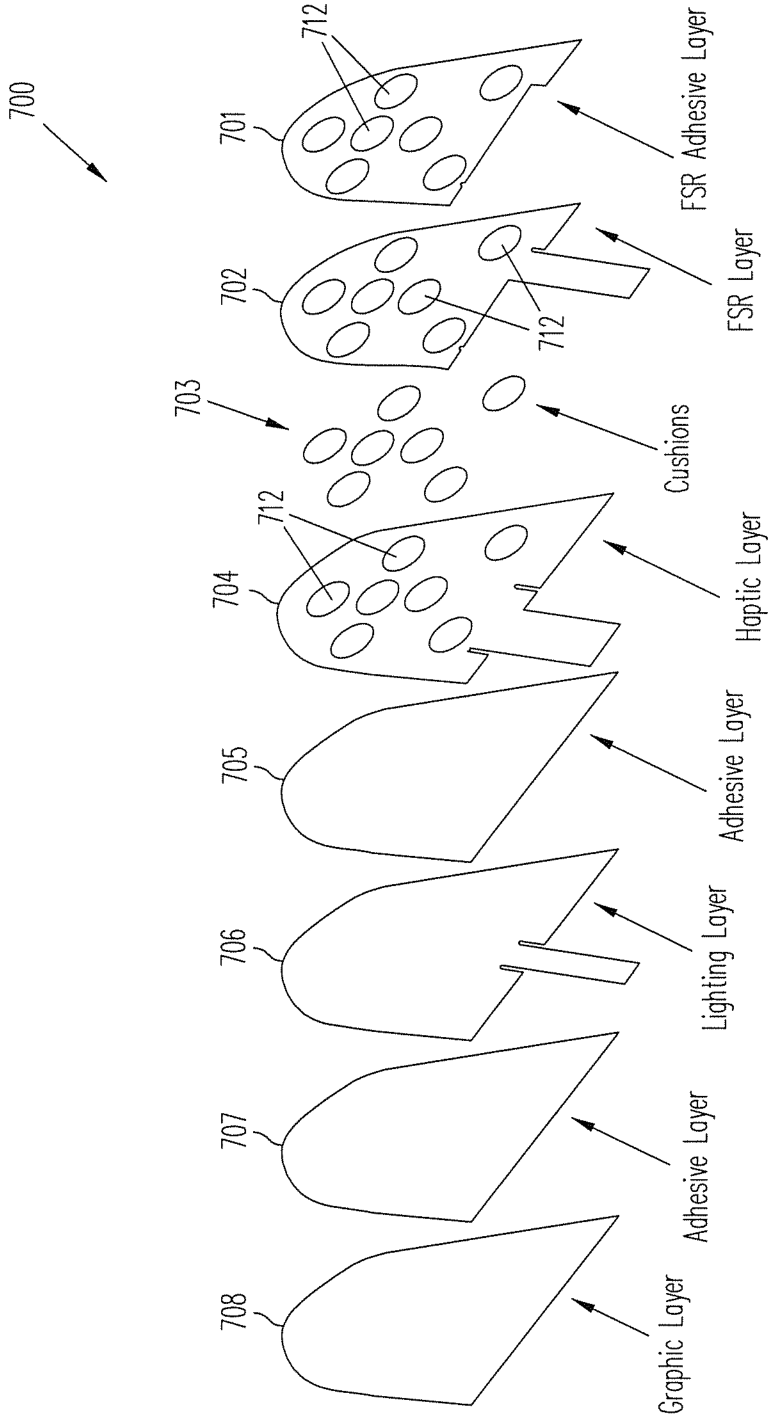
FIG. 1 shows ultra-thin haptic switch 700, in accordance with one embodiment of the present invention.

The present invention provides an ultra-thin structure suitable for use as a haptic switch. FIG. 1 shows ultra-thin haptic switch structure 700, in accordance with one embodiment of the present invention. As shown in FIG. 1, ultra-thin haptic switch structure 700 includes (a) force sensing layer 702, (b) EMP haptic layer 704, (c) printed light emitting diode (LED) layer 706, and (d) printed graphic layer 708. Adhesive layer 701 secures force sensing layer 702 to a substrate, adhesive layer 705 secures EMP haptic layer 704 to printed LED 706, and adhesive layer 707 secures graphic layer 708 to printed LED layer 706. As shown in FIG. 1 also, force sensing layer 702 is separated from EMP haptic layer 704 by cushions 703. As discussed in further detail below, EMP haptic layer 704 includes a number of EMP actuators that provide haptic responses. Cushions 703 are set-offs that provide room between EMP haptic layer 704 and force sensing layer 702 within which the EMP actuators of EMP haptic layer 704 may provide a vibration response without coupling force sensing layer 702. Adhesive layer 705 may be provided also as a suitable protective film layer to provide EMP haptic layer 704 with additional ruggedness.

Figure 2A:
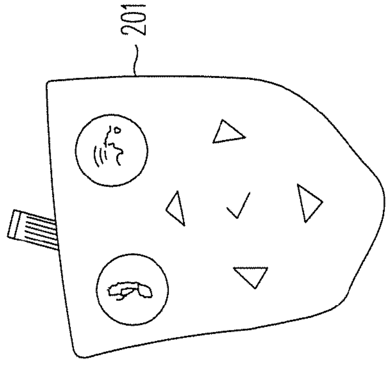
FIGS. 2(*a*) and 2(*b*) show flat printed graphic layer 201 and embossed printed graphic layer 202, respectively, which are alternative implementations of printed graphic layer 708 of FIG. 1.
Figure 2B:
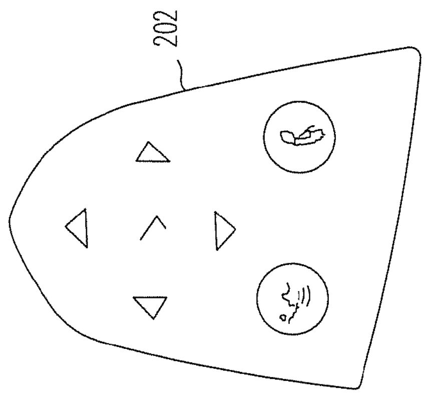

FIGS. 2(*a*) and 2(*b*) show flat printed graphic layer 201 and embossed printed graphic layer 202, respectively, which are alternative implementations of printed graphic layer 708 of FIG. 1. As shown in FIGS. 2(*a*) and 2(*b*), the printed graphic layers include familiar symbols representing control keys in a user interface of a consumer electronic device (e.g., keys on a remote control device for a video player).

Figure 3:
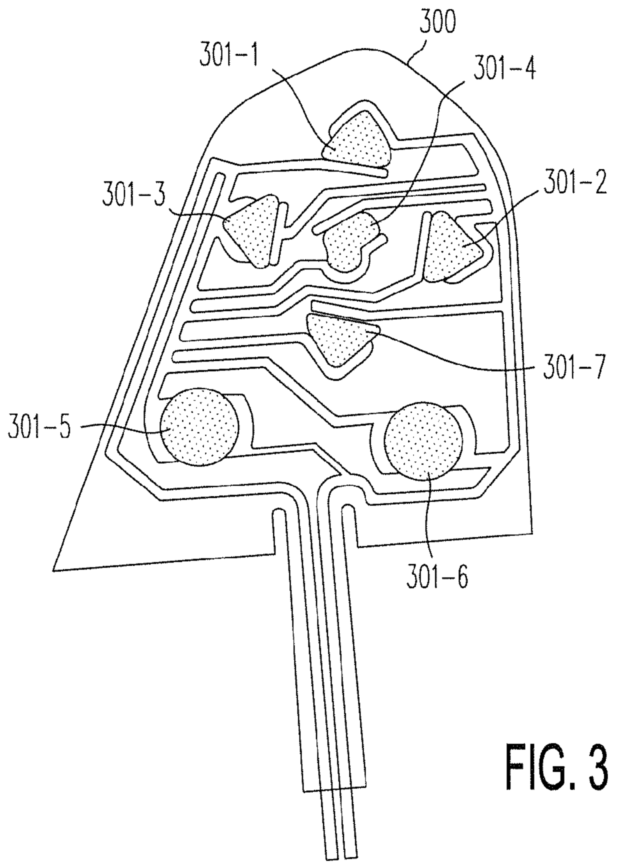
FIG. 3 shows flexible circuit 300, which is an implementation of printed LED layer 706 of FIG. 1.

FIG. 3 shows flexible circuit 300 which implements printed LED layer 706 of FIG. 1. As shown in FIG. 3, flexible circuit 300 includes LED devices 301-1 to 301-7, which are aligned to the printed control key symbols on either of printed graphic layers 201 and 202, and conductors provided to connect the power and ground sources to the terminals of LED 301-1 and 301-7. When power is applied, LED 301-1 and 301-7 illuminate the symbols on the corresponding printed graphic layer.

Figure 5:
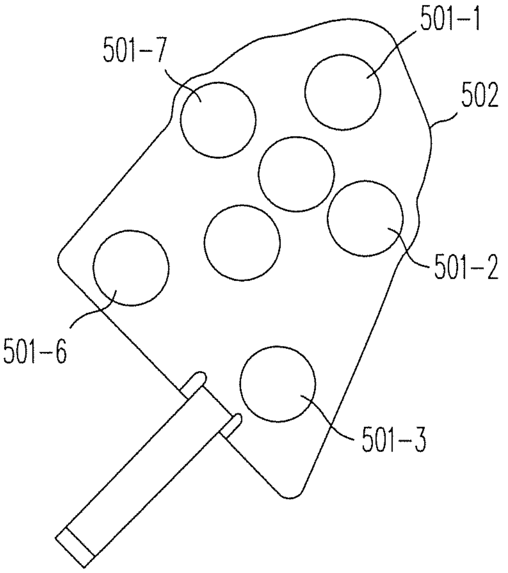
FIG. 5 shows force sensing layer 702 of haptic switch 700 (shown in FIG. 1), including FSRs 501-1 to 501-7 that are provided on flexible circuit 502.

Force sensing layer 702 may include a number of force sensing resistors (FSRs) mounted on a flexible circuit. FIG. 5 shows force sensing layer 702 of haptic switch 700 (shown in FIG. 1), including FSRs 501-1 to 501-7 that are provided on flexible circuit 502. Flexible circuit 502 can be bonded onto adhesive layer 701. Adhesive layer 701 allows force sensing layer 702 to be bonded onto any flat surface. Each of FSRs 501-1 to 501-7 may be implemented using a pressure-sensitive EMP sensor, such as a piezo-electric EMP device. As shown in FIG. 1, adhesive layer 701 and force sensing layer 702 provide windows 712 within which FSRs 501-1 to 501-7 may be bonded. Besides piezo-electric EMP devices, other pressure sensing devices may also be used. In response to an applied pressure, a piezo-electric EMP device provides an electrical signal (e.g., a voltage difference) which magnitude is related to the applied pressure. As shown in FIG. 5, the electrical signals from FSRs 501-1 to 501-7 ("pressure sensor signals") are routed on conductors printed on flexible circuit 502 to flexible cable 503, so as to route the pressure sensor signals onto an external signal processing device.

Figure 4:
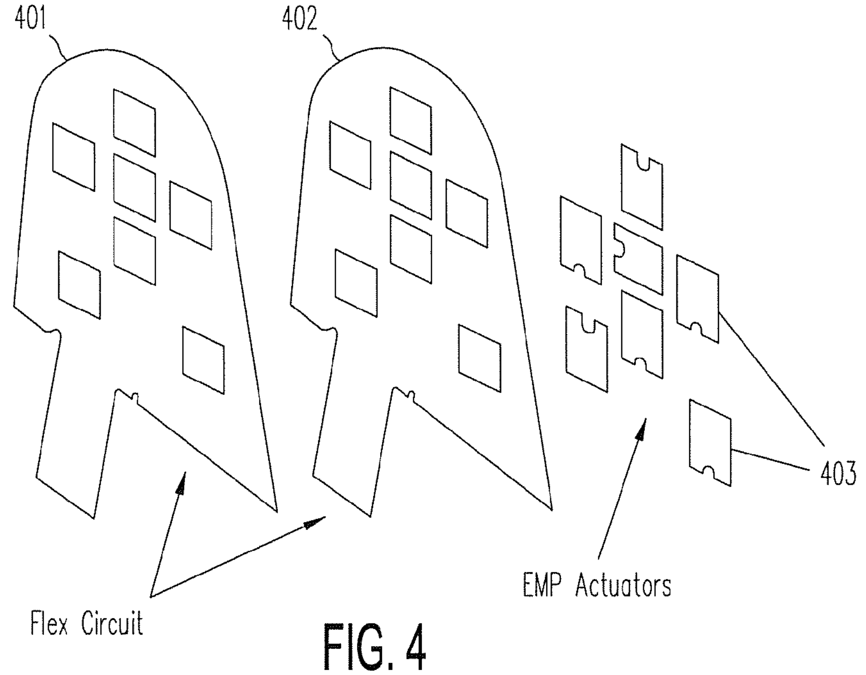
FIG. 4 shows structure 400, which implements EMP haptic layer 704 of FIG. 1, according to one embodiment of the present invention.
Figure 6:
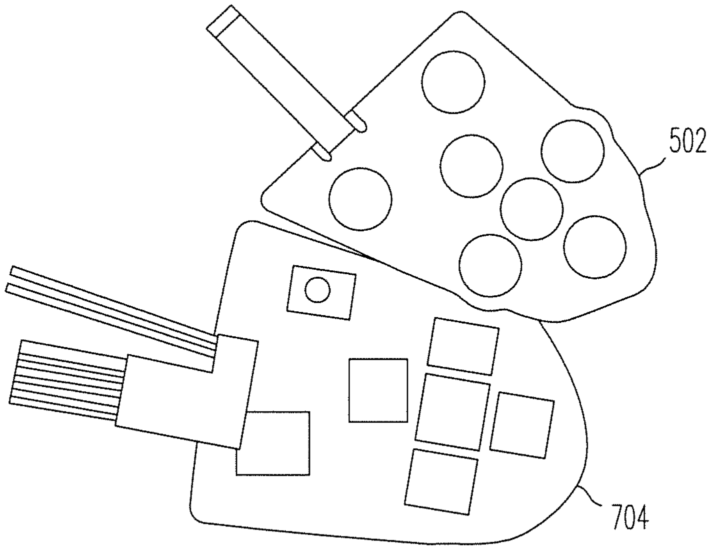
FIG. 6 shows flexible circuit 502 of FIG. 5, detached from EMP haptic layer 704, according to one embodiment of the invention.

FIG. 6 shows flexible circuit 502 (of force sensing layer 702) detached from EMP haptic layer 704, in one embodiment of the invention. FIG. 4 shows structure 400, which implements EMP haptic layer 704 of FIG. 1, according to one embodiment of the present invention. As shown in FIG. 4, EMP haptic layer 704 may include one or more flexible circuits (represented in FIG. 4 by flexible circuits 401 and 402) having windows within which EMP actuators 403 may be bonded. EMP actuators 403 may be EMP actuators, such as those described in the Copending Applications or the Embossed Key Application. Conductors printed on flexible circuits 401 and 402 provide the electrical stimuli to each of EMP actuators 403 to cause the mechanical haptic response.

Figure 7:
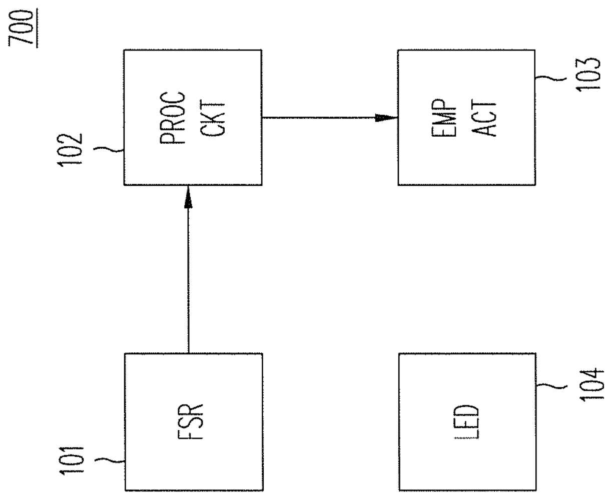
FIG. 7 shows block diagram 700 which represents a haptic switch, in accordance with one embodiment of the present invention.

FIG. 7 shows a block diagram which represents an ultra-thin haptic switch 100, in accordance with one embodiment of the present invention. As shown in FIG. 7, haptic switch 100 includes a force sensing element 101, processing circuit 102, EMP actuator 103 and lighting element 104. Lighting element 104 provides illumination to haptic switch 100, thereby steering a user to the location of force sensing element 101. When a user applies a pressure on force sensing element 101, which may implement, for example, any of FSR 501-1 to 501-7 of FIG. 5, force sensing element 101 provides its electrical response to processing circuit 102. Processing circuit 102 may be, for example, an amplification circuit. When the force imposed on force sensing element 101 exceeds a pre-determined threshold, processing circuit 102 provides a control signal to EMP actuator 103, causing it to provide a haptic response, such as a vibration. The magnitude of the haptic response may be, for example, proportional to the pressure sensed or a predetermined constant value, depending on the specific application.

One advantage of a ultra-thin haptic switch of the present invention is its light weight and can be bonded to any surface, replacing bulky mechanical switches, such as snap domes or rocker switches, that require complex molded shapes and unique mechanical fixtures. Unlike a conventional bulky mechanical switch of the prior art, there is no requirement of complex cut-outs and costly mechanical support mounts to attach the switch to the intended use location, thereby avoiding cost and manufacturing complexity.

The above detailed description is provided to illustrate specific embodiments of the present invention and is not intended to be limited. Numerous modifications and variations within the scope of the present invention are possible. The present invention is set forth in the accompanying claims.

I claim:

1. A haptic switch, comprising:

one or more flexible circuit layers with conductors formed thereon;

a force sensor mounted on one of the flexible circuit layers responding to a mechanical stimulus by providing a sensing signal on a conductor of the flexible circuit layer on which the force sensor is mounted;

connections which are electrically coupled to the conductors of the flexible circuit layers and over which a processing circuit receives the sensing signal and provides a control signal; and an electromechanical polymer (EMP) actuator mounted on one of flexible layers receiving the control signal over a conductor of the flexible circuit layer on which the EMP actuator is mounted, the EMP actuator providing a haptic response, wherein the one or more flexible circuit layers are configured to have a profile that is capable of a surface deformation such that the haptic switch can be directly bonded to any surface.

2. The haptic switch of claim 1, wherein the force sensor comprises a pressure-sensitive EMP sensor.

3. The haptic switch of claim 1, wherein the processing circuit comprises an amplification circuit.

4. The haptic switch of claim 1, wherein the control signal is provided when the sensing signal reaches a predetermined threshold value.

5. The haptic switch of claim 1, wherein the haptic response comprises a vibration response.

6. The haptic switch of claim 1, further comprising a light source providing illumination in vicinity of the force sensor.

7. The haptic switch of claim 6, wherein the light source comprises a printed LED circuit.

8. The haptic switch of claim 1, wherein the force sensor comprises a force sensing resistor.

9. The haptic switch of claim 1, wherein the force sensor and the EMP actuator are each bonded to a separate flexible circuit formed on the flexible circuit layers.

10. The haptic switch of claim 9, further comprising a protective layer overlying the flexible circuit to which the EMP actuator is bonded.

11. The haptic switch of claim 10, further comprising a light source and a graphic layer on which is provided a symbol representing a key, wherein the symbol, the light source, the EMP actuator and the force sensor are aligned such that the light source illuminates the symbol and such that, when a user pushes on the symbol, the user's push applies a pressure on the force sensor and the EMP actuator's haptic response is provided in the vicinity of the force sensor.

12. A method for operating a haptic switch, comprising:

providing one or more flexible circuit layers on which conductors are formed and connections over the conductors to a processing circuit are provided;

forming or mounting a force sensor and an electromechanical polymer (EMP) actuator each on one of the flexible circuit layers, the force sensor and the EMP actuator each being electrically connected by the conductors to the connections;

responding to a mechanical stimulus in the force sensor by asserting a sensing signal to be sent over one of the connections to the processing circuit; and in response to the sensing signal, sending from the processing circuit a control signal over one of the connections to cause a haptic response in the EMP actuator, wherein the one or more flexible circuit layers are configured to have a profile that is capable of a surface deformation such that the haptic switch can be directly bonded to any surface.

13. The method of claim 12, wherein the force sensor comprises a pressure-sensitive EMP sensor.

14. The method of claim 12, wherein the processing circuit comprises an amplification circuit.

15. The method of claim 12, wherein the control signal is provided when the sensing ng signal reaches a predetermined threshold value.

16. The method of claim 12, wherein the haptic response comprises a vibration response.

17. The method of claim 12, further comprising illuminating a vicinity of the force sensor.

18. The method of claim 17, wherein the illumination is provided by a printed LED circuit.

19. The method of claim 12, wherein the force sensor comprises a force sensing resistor.

20. The method of claim 12, further comprising providing the force sensor and the EMP actuator by bonding each on a separate flexible circuit formed on the flexible circuit layers.

21. The method of claim 20, further comprising providing a protective layer overlying the flexible circuit to which the EMP actuator is bonded.

22. The method of claim 21, further comprising providing a light source and a graphic layer on which is provided a symbol representing a key, wherein the symbol, the light source, the EMP actuator and the force sensor are aligned such that the light source illuminates the symbol and such that, when a user pushes on the symbol, the user's push applies a pressure on the force sensor and the EMP actuator's haptic response is provided in the vicinity of the force sensor.

* * * * *

UNITED STATES PATENT AND TRADEMARK OFFICE

CERTIFICATE OF CORRECTION

PATENT NO. : 9,576,446 B2
APPLICATION NO. : 14/454526
DATED : February 21, 2017
INVENTOR(S) : Brian C. Zellers It is certified that error appears in the above-identified patent and that said Letters Patent is hereby corrected as shown below:

In the Claims

Column 5, Line 4, delete "ng"

Signed and Sealed this
Twelfth Day of September, 2017

Joseph Matal

Joseph Matal
*Performing the Functions and Duties of the*
*Under Secretary of Commerce for Intellectual Property and*
*Director of the United States Patent and Trademark Office*